A. B. COLEMAN.
SHOVEL, SPADE, AND THE LIKE.
APPLICATION FILED JAN. 7, 1920.
1,374,061.
Patented Apr. 5, 1921.
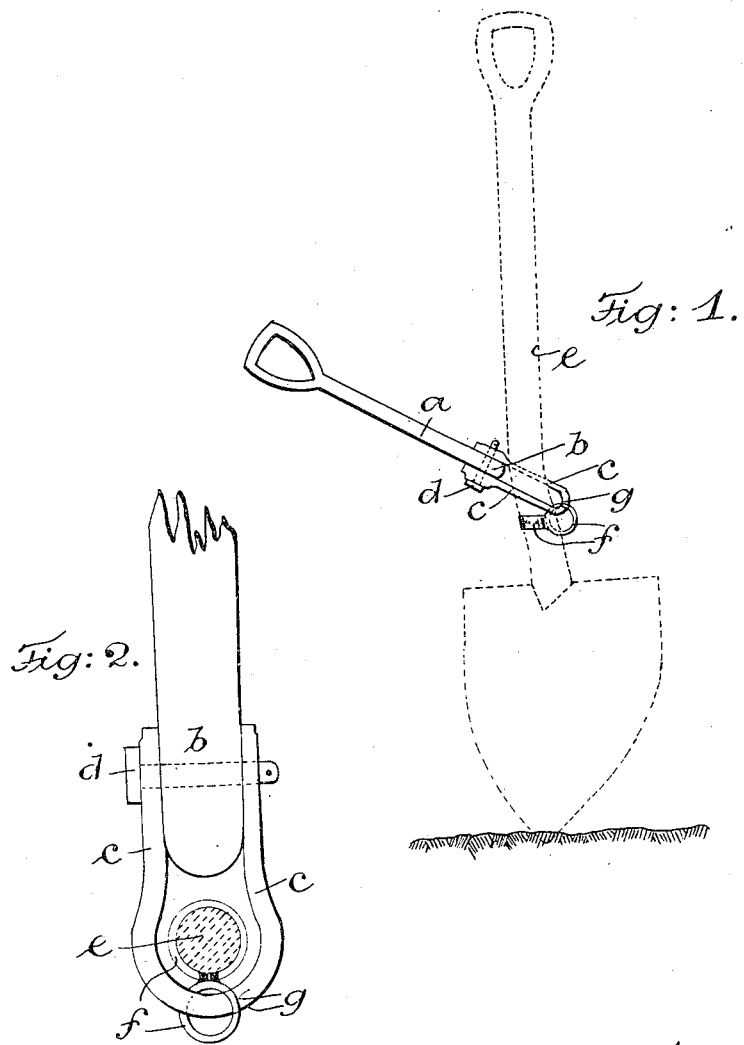

UNITED STATES PATENT OFFICE.

ARTHUR BERTRAM COLEMAN, OF GOSNELLS, NEAR PERTH, WESTERN AUSTRALIA, AUSTRALIA.

SHOVEL, SPADE, AND THE LIKE.

1,374,061.   Specification of Letters Patent.   Patented Apr. 5, 1921.

Application filed January 7, 1920. Serial No. 349,972.

*To all whom it may concern:*

Be it known that I, ARTHUR BERTRAM COLEMAN, a subject of the King of Great Britain, and residing at Wheatley street, Gosnells, near Perth, Western Australia, Commonwealth of Australia, have invented certain new and useful Improvements in Shovels, Spades, and the like, of which the following is a specification.

This invention relates to spades, field forks and the like hand operated implements, the primary object of the invention being to provide means in connection with such implement whereby they may be utilized without necessitating the user to assume a bent-over position whereby this invention eliminates to a large degree backaches and other discomforts heretofore considered incidental to work of this character.

The invention essentially resides in the application and employment of an additional or secondary handle as a removable attachment to and in operative combination with the primary or main handle of the implement, and further the invention does not require the alteration of the construction of the said primary handle.

My handle in use and operation constitutes a working extension of the natural arm of the user thus rendering it unnecessary for him to stoop and grip the main handle near the bowl of the spade, as is now the common practice when lifting the spade out of the ground for the purpose of turning the soil.

The use and construction of the device embodying my invention will now be explained with the aid of the attached drawings, wherein:—

Figure 1 is an elevation showing the additional or secondary handle fitted to the implement.

Fig. 2 is an enlarged detail view of the secondary handle and its connection with the primary handle.

Referring to said drawing, the additional handle is denoted by the letter $a$ and this handle may be of any approved design or shape. A U-shaped bail clip $c$ passes through an eye band $f$ secured to the main handle, embraces the primary handle $e$ of the spade and has its free ends removably connected to the lower end $b$ of the secondary handle by means of the pin $d$. The eye band $f$ engages the primary handle, and is provided with a large eye in which the loop of the U-shaped bail is loosely engaged. The eye band $f$ therefore acts in conjunction with the bail clip $c$ as a loose hingeable connection for the secondary handle $a$, and said eye band may be positioned about the handle $e$ to suit the physical convenience of the user.

Additional or secondary handle $a$ is operatively connected to the main handle $e$ in a free and flexible manner and allows the use of the spade or other implement in digging and cultivating without the necessity of stooping to an uncomfortable position in lifting the implement out of the ground.

What I claim as my invention and desire to secure by Letters Patent is:—

In combination with a spade having a main handle, a secondary handle, a U-shaped member embracing the main handle and connected to one end of said secondary handle, and an eye band secured to said main handle having a large opening therein for loosely engaging the loop of said U-shaped member and thereby acting as a loose pivotal connection therefor.

In testimony whereof I have hereunto set my hand in presence of two subscribing witnesses.

ARTHUR BERTRAM COLEMAN.

Witnesses:
 RICHARD SPARROW,
 U. W. BURKE.